United States Patent [19]

Tanasawa

[11] 4,389,986
[45] Jun. 28, 1983

[54] DIRECT INJECTION TYPE INTERNAL COMBUSTION ENGINE WITH A LOW PRESSURE FUEL INJECTOR

[75] Inventor: Yasusi Tanasawa, Nagoya, Japan

[73] Assignee: Kabushiki Kaisha Toyota Chuo Kenkyusho, Noyoya, Japan

[21] Appl. No.: 160,283

[22] Filed: Jun. 17, 1980

[30] Foreign Application Priority Data

Jun. 30, 1979 [JP] Japan .................................. 54-83293

[51] Int. Cl.³ .............................................. F02B 3/02
[52] U.S. Cl. .................................... 123/298; 123/472; 123/659
[58] Field of Search ............... 123/298, 305, 294, 276, 123/261, 193 P, 659, 472; 239/124

[56] References Cited

U.S. PATENT DOCUMENTS

| | | | |
|---|---|---|---|
| 2,100,143 | 11/1937 | Mock | 123/261 |
| 3,241,768 | 3/1966 | Croft | 239/124 |
| 4,155,332 | 5/1979 | Yaegashi et al. | 123/478 |

FOREIGN PATENT DOCUMENTS

| | | | |
|---|---|---|---|
| 815580 | 10/1951 | Fed. Rep. of Germany | 123/276 |
| 2725135 | 12/1978 | Fed. Rep. of Germany | 239/124 |
| 804996 | 11/1936 | France | 123/659 |
| 473174 | 8/1937 | United Kingdom | 123/294 |

Primary Examiner—Charles J. Myhre
Assistant Examiner—Andrew M. Dolinar
Attorney, Agent, or Firm—Oblon, Fisher, Spivak, McClelland & Maier

[57] ABSTRACT

A direct injection type internal combustion engine with a low pressure fuel injector includes a cylinder block having a predetermined number of cylinders, a cylinder head mounted on the cylinder block, a piston which has a large surface area at its head wall and a high heat transfer ability and is reciprocally movable within the cylinder for affording rotational motion to a crankshaft, a combustion chamber formed among the piston, the cylinder and the cylinder head, an intake valve mechanism for opening and closing an intake passage to be communicated with the combustion chamber, igniting means having its igniting portion facing the combustion chamber, a low pressure fuel injector as fuel supply means having an injection port of a wide injection angle and directed toward the head wall of the piston, and an exhaust valve mechanism for opening and closing an exhaust passage to be communicated with the combustion chamber. The low pressure fuel injector begins to supply a predetermined quantity of low pressure fuel which can be completely vaporized toward the top surface of the piston, at the suction stroke. The low pressure fuel thus supplied is brought into contact with the large top surface of the piston, and is vaporized from the top surface so that the gasification of the fuel is promoted to completely burn the fuel and to prevent emission of unburned noxious contents such as hydrocarbons.

15 Claims, 17 Drawing Figures

FIG. 14
FIG. 12
FIG. 13
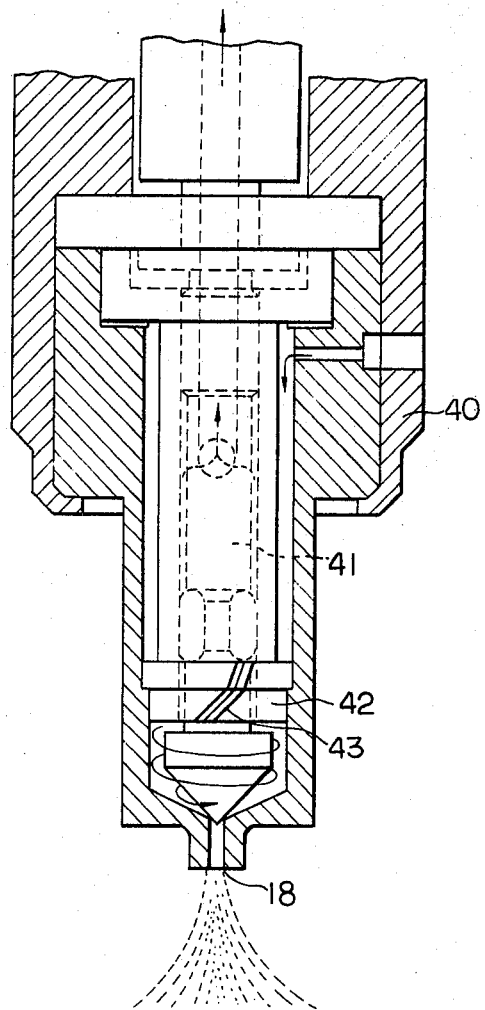
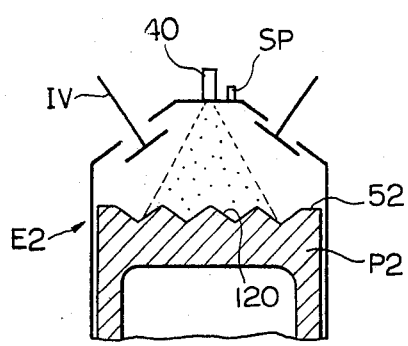
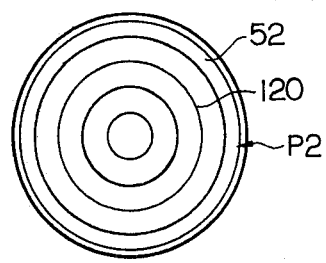

DIRECT INJECTION TYPE INTERNAL COMBUSTION ENGINE WITH A LOW PRESSURE FUEL INJECTOR

BACKGROUND OF THE INVENTION

1. Field of the Invention

The present invention relates to a direct injection type internal combustion engine with a low pressure fuel injector, in which a low pressure fuel, such as gasoline, light oil, benzene, ethyl and methyl alcohols, their mixed oil, or emulsion oils with water, air or other chemicals, is directly injected to a head wall or a top surface of the piston in the combustion chamber during the suction stroke, so that the present invention may ensure enough time for ebullition of the fuel, completely vaporize the fuel therefrom and then burn the vaporized fuel thereby to effect the combustion highly efficiently and to prevent the emission of unburned noxious gases such as hydrocarbon and the like.

2. Description of the Prior Art

Conventionally, an internal combustion engine of the type in which gasoline is directly injected into the combustion chamber and is ignited with an electric in what is called "Hesselman engine", has disadvantages since it injects the fuel during the compression stroke of the engine, it has to use a high pressure fuel injection device with an ignition device therefor so that the construction thereof is very complex and price thereof is very expensive. Also, gasoline droplets having a large particle diameter are supplied into the combustion chamber so that it has not been able to obtain the desired effects. Therefore, such a Hesselman engine has not been practically and widely used.

The most disadvantageous point of the prior art is the fact that sufficient ebullition time of the fuel cannot be ensured, because the fuel is injected into the combustion chamber at the end of the compression stroke of an engine.

In the case of a diesel engine, on the other hand, since it has a high compression ratio of 16 to 20, the pressure and temperature of air within the combustion chamber of the engine become high at the end of the compression stroke so that atomized light oil which is injected under high pressure conditions is ignited after a very short interval of the ignition delay of the engine.

However, in the case of a Hesselman engine it has a relatively low compression ratio of 8 to 12 so that the temperature of air within the combustion chamber at the end of the compression stroke is far lower than that in the case of the diesel engine. Therefore, in the Hesselman engine, it is difficult not only to ignite gasoline but also to completely vaporize all the gasoline. Moreover, as described above, since the fuel is injected at the end of the compression stroke, the injection timing of the gasoline is close to the top dead center and there is little time necessary for vaporization (or ebullition) of the fuel.

Accordingly, in the Hesselman engine, it is impossible to mix gasoline droplets in the gasoline vapor and to produce a reproducible and stable combustion condition.

The results of the ebullition rate estimated based on the conventional studies which have been conducted by the Invertor, are as shown in FIGS. 1 and 2, respectively.

FIG. 1 shows the time necessary for the gasoline droplets having a diameter of 100 microns to finish their ebullition during the suction stroke. While, FIG. 2 shows the time necessary for the gasoline droplets having a diameter of 100 microns to finish their ebullition during the compression stroke.

In FIG. 1, curve I is plotted for the case where the gasoline droplets are floating in hot gases under a pressure of 1 atm, whereas curve II is plotted for the case where the gasoline droplets in the hot gases under pressure 1 atm are brought into contact with the hot solid surface.

In FIG. 2, on the other hand, curve III is plotted in case the gasoline droplets are floating in hot gases under a pressure of 10 atms, whereas curve IV is plotted for the case where the gasoline droplets in the hot gases under pressure 10 atms are brought into contact with the hot solid surface.

In other words, the curves I and III illustrate the time necessary for the gasoline droplets having the diameter of 100 microns to be gasified while being floating in the hot gases.

Where the four-cycle engine is turned at 1500 r.p.m., its suction and compression strokes are completed for $(60s/1500)/2 \approx 20$ ms, respectively.

In the actual engine, on the contrary, since the average temperature and pressure of the mixture during the suction stroke are 70° to 150° C. and about 0.5 to 1 atm (ata), respectively, the time of 300° to 160 ms is required for the complete ebullition. In the conventional internal combustion engine with a carburetor, as shown in FIGS. 3 and 4, little ebullition of the gasoline droplets takes place during the suction stroke and at the end thereof.

On the other hand, in a direct injection type internal combustion engine with a low pressure fuel injector according to the present invention which will be described later, as shown in FIGS. 5 and 6, the gasoline droplets are supplied to a head wall formed with a fin of a piston P' from an injection valve F for a short period in the form of atomization at the initial stage during the suction stroke, and is brought into contact with the head wall of the piston so that the gasoline droplets in the form of a jet begins to be instantly vaporized or boiled away (such a condition being called an ebullition, not an evaporation) thereby to be almost completely vaporized by the end of the suction stroke.

While, since the average temperature and pressure of the mixture during the compression stroke become about 325° C. and about 10 atms (ata), respectively, the time of about 18 ms is required for the complete ebullition so that the ebullition can be almost finished during the compression stroke, assuming that the compression ratio is 8.5 and the average pressure and temperature within the combustion chamber are increased to 20 atms from 1 atm and to 560° C. from 100° C., respectively, during the compression stroke.

On the other hand, the times required for the ebullition for the case in which the gasoline droplets having the diameter of 100 microns come into contact with the hot solid surface are illustrated in the curve II for the suction stroke and in the curve IV for the compression stroke. Thus, the ebullition can be instantly finished if the temperature of the solid surface is raised close to the maximum ebullition rate as shown in the point a in FIG. 1. The point b appearing in FIG. 1 is the so-called "Leydenfrost" point. If the solid surface is maintained at the Leydenfrost point, the gasoline droplets do not form a liquid film on the solid surface, when they come into contact, but jump up in a round shape into the hot gases.

The experimental results thus far discussed are gathered for the gases under stationary conditions. In case the gases are flowing while becoming turbulent, the time necessary for the ebullition will be reduced to a few ten % of that in the stationary conditions.

Even in that case, however, it can be deduced that the time for ebullition is far shorter for the case of contacting with the solid surface than for the case of floating in the gases.

According to the experiments conducted by the Inventor, in the conventional direct injection type internal combustion engine in which the fuel is injected at the end of the compression stroke of the engine, the time required for ebullition of the fuel cannot be necessarily ensured because the fuel is injected during the compression stroke.

Accordingly, the Inventor has directed his attention to the above-mentioned points in order to solve these problems of the prior art and conducted various experiments according to his experiential philosophy that in a spark-ignition type internal combustion engine, the best performance of the engine can be obtained if all the liquid fuel is vaporized and burned. The present invention has been invented from these experiments for solving the aforementioned problems.

SUMMARY OF THE INVENTION

It is therefore an object of the present invention to provide a direct injection type internal combustion engine with a low pressure fuel injector in which the atomized fuel droplets begin to be injected directly from the pressure fuel injector at the suction stroke of an engine toward a top surface of the piston which has a large surface area and is heated to a high temperature for heat transfer to the fuel in order to ensure sufficient time for ebullition of the fuel before the combustion. The fuel droplets are brought into contact with the hot surface thereof and are instantly and completely vaporized therefrom to increase the gasification rate and to effect the combustion highly efficiently; while a small quantity of the atomized fuel in a floating condition in the combustion chamber has its vaporization (ebullition) promoted by the heat transfer between the large surface area of the piston and the high temperature and high pressure air in the combustion chamber during the compression stroke so that the ebullition of the fuel as a whole is remarkably promoted to effect highly efficient combustion thereby to prevent the emission of the unburned noxious contents such as hydrocarbons.

A primary object of the present invention is to provide a direct injection type internal combustion engine with a low pressure fuel injector which begins to inject the fuel at the suction stroke of the engine toward the hot top surface of the piston having a large surface area to ensure sufficient time for fuel ebullition from the hot solid surface thereby completely and instantly vaporizing or boiling the fuel therefrom so that a highly efficient combustion can be realized and the emission of unburned noxious contents such as hydrocarbon and the like can be prevented.

Another object of the present invention is to provide a direct injection type internal combustion engine with a low pressure fuel injector which can use as a fuel not only gasoline but also any fuel which can be instantly vaporized or boiled, such as light oil, benzene, ethyl alcohol, methyl alcohol, emulsion oil with water, air or other chemicals or the like, thereby realizing the application to the present sutiation under which the reduction of energy is greatly required.

Still another object of the present invention is to provide a direct injection type internal combustion engine with a low pressure fuel injector which has a simple construction and a low price.

A further object of the present invention is to provide a direct injection type internal combustion engine with a low pressure fuel injector which can supply the atomized fuel droplets having a very small particle diameter without forming the fuel liquid film on the inner wall of the intake passage and intake valve and can realize the uniform distribution of the fuel to each cylinder.

Still further object of the present invention is to provide a direct injection type internal combustion engine with a low pressure fuel injector in which the top surface of the piston has a large surface area to increase heat transfer between the top surface and the air in the combustion chamber thereby promptly to raise the temperature at the top surface to a suitable level at which the fuel ebullition from the hot surface is to be effected.

The direct injection type internal combustion engine with a low pressure fuel injector according to the present invention is constructed to comprise a cylinder block having a predetermined number of cylinders, a cylinder head mounted on the cylinder block, a piston which has a large surface area at its top surface and a high heat transfer ability and is made reciprocally movable within a cylinder for affording rotational motions to a crankshaft, and a combustion chamber to be formed among the piston, the cylinder and the cylinder head. An intake valve mechanism opens and closes an intake passage to be communicated with the combustion chamber. An ignition means having its igniting portion facing the combustion chamber, low pressure fuel supply means for beginning to supply a predetermined quantity of the low pressure fuel at the suction stroke toward a top surface of the piston having a large surface area, which is heated to a predetermined high temperature by the combustion in the combustion chamber, and an exhaust valve mechanism for opening and closing an exhaust passage to be communicated with the combustion chamber are also provided.

The direct injection type internal combustion engine with a low pressure fuel injector having the aforementioned construction according to the present invention can enjoy the operational effect that the low pressure fuel is brought during the suction stroke by the low pressure fuel supply means into contact with the head wall or top surface of the piston, which is heated to the predetermined high temperature to ensure enough ebullition time of the fuel, and is almost completely vaporized from the top surface by the end of the suction stroke so that the gasification of the fuel may be promoted to effect the combustion efficiently and to prevent emission of unburned noxious contents such as hydrocarbons.

Namely, since the present invention begins to inject the fuel at the suction stroke, it is possible to ensure sufficient time for fuel ebullition from the solid hot surface so that the combustion of the fuel can be carried out after the fuel is completely vaporized or boiled. Therefore, a highly efficient combustion can be realized to prevent the emission of unburned noxious gases such as hydrocarbon and the like.

Further, the present invention can use any low pressure fuel which can be completely vaporized or boiled without being limited to gasoline. In other words, since the fuel begins to be injected at the suction stroke, enough fuel ebullition time can be ensured even in the case of a low pressure fuel.

Moreover, since the fuel begins to be injected at the suction stroke and there is enough fuel ebullition time before the combustion, it is not necessary to increase the pressure of the fuel by using an expensive high pressure fuel injector in order to produce more atomized fuel droplets.

By enlarging the surface area of the piston head wall, on the other hand, it becomes possible to promptly heat the piston head wall to a predetermined high temperature. As a result, the solid surface ebullition of the fuel to be essentially required can be attained speedily and also a great amount of the fuel can be vaporized because of the large surface area of the piston head wall.

In the conventional internal combustion engine with a usual carburetor or internal combustion engine with a fuel injection device in which the fuel is injected in the vicinity of the intake valve, the injected fuel contacts the inner wall of the intake passage and intake valve and wets them so that a fuel liquid film is formed thereon and then such fuel droplets having a large diameter obtained by separating the fuel liquid film is supplied into the combustion chamber. Further it results in inviting an uneven distribution of the fuel to each cylinder.

According to the present invention, on the other hand, since the fuel is directly injected into the combustion chamber, the injected fuel does not contact the inner walls of the intake passage and intake valve and does not wet them so that atomized fuel droplets having a very small diameter can be supplied to the combustion chamber without forming the fuel liquid film, resulting in realizing the uniform distribution of the fuel to each cylinder. Moreover, since the present invention injects the fuel toward the top surface of the piston having a large surface area, it is able to increase the fuel ebullition rate effectively.

Further, since the present invention can use any low pressure fuel which can be completely vaporized, its injection pressure is low so that the power necessary for its injection can be also remakably reduced. Because of use of the low pressure fuel, not only the fuel consumption rate can be markedly improved but also it is possible to cope with the change of a fuel source for an engine.

Thus, the present invention can sufficiently apply to the present situation at which the reduction of an energy has greatly been required.

The present invention uses a direct injection type low pressure fuel injector as a fuel supply means which has its injection port opened into the combustion chamber and directed toward the top surface of the piston having a large surface area to be heated to a high temperature of about 200° to 300° C. and has a high heat transferring ability. The low pressure fuel is injected to the top surface of the piston from its injection port at a wide injection angle so that the injected fuel is made to impinge upon the large top surface of the piston during the suction stroke. As a result, the fuel can be completely and instantly vaporized from the top surface of the piston thereby to remarkably promote the fuel ebullition from the solid hot surface and to almost completely gasify the fuel by the ignition time.

Moreover, since the present invention is so constructed that the injection port of the direct injection type low pressure fuel injector is directed toward the top surface of the piston having a large surface area, the injected fuel is brought into contact with the top surface having a high heat transfer and is instantly vaporized therefrom. Also, a metered quantity of fuel can be injected at the most proper injection angle from the most proper position thereto free from any restriction as to the mechanism, the related structure thereto and the arrangement of the existing intake valve. Further, since all the fuel is directly injected to the top surface of the piston with high reliability, the present invention has also another advantage that the response of the engine can be improved, while being free from the drawback of the fuel remaining in the intake passage appearing in the prior art.

In the present invention, it is not necessary to use the conventional high pressure fuel injection device which is very complex in its construction and is very expensive in its price as its fuel supply means. A low pressure fuel injector of the electronic control or electromagnetic control type is used as the fuel supply means, which has a simple construction and a low price. Namely, as the low pressure fuel injector, a spill type swirl injection valve of the electronic control type, a diverging type swirl injection valve or the like can be applied and practiced in the present invention.

Especially, as shown in FIGS. 9 to 11 and 14 (which will be described later in detail), the fuel is swirled within a swirl chamber in the fuel injection valve so as to allow the fuel to be spilled and then this swirling energy of the fuel is utilized effectively in order to inject the atomized fuel toward the top surface of the piston at a wide injection angle immediately after the beginning of the injection. As a result, all the fuel can be made to impinge upon the top surface of the piston to be heated to a predetermined high temperature.

As shown in FIG. 17, moreover, since a leading seat portion of a needle valve in the fuel injection device is formed into a frusto-conical shape with a predetermined angle, the fuel jet itself can provide the directional quality, thereby to increase the fuel injection force. As a result, the atomized fuel can be injected at a wide injection angle immediately after the beginning of the injection and can be made to impinge upon the entire top surface having a large surface area of the piston with a high reliability, which surface is to be heated to a predetermined high temperature. Whereby, a stable and excellent ebullition of the fuel from the top surface of the piston can be ensured and more promoted.

In the present invention, for the purpose of more promptly heating the piston head wall to a predetermined high temperature, the top surface of the piston can be constructed by a fin or formed into a cup shape, thereby to remarkably increase the heating rate of the piston head wall on which the fuel ebullition from the hot solid surface is to be effected. Thus, a temperature of the top surface of the piston is more effectively and promptly increased.

Moreover, by suitably selecting the shape and size of the fin, the temperature of the fin can be adjusted and controlled, and at the same time the ebullition rate of the fuel can be also adjusted. On the other hand, most of the fuel injected during the suction stroke is brought into contact with the top surface of the piston so that it is converted into vapors almost completely, but a small quantity of atomized fuel droplets floating in the air while being kept away from the top surface of the piston is brought into a condition close to the supercritical condition (where the pressure and temperature are so high that a liquid is wholly converted into gas state). As the temperature and pressure of the air are raised during the compression stroke of the engine, the atomized fuel droplets floating in the air are also completely vaporized. Consequently, almost all of the fuel is completely converted into vapors before it is ignited with the electric spark of the ignition means, because the fuel is injected during the suction stroke. As a result, combustion is accomplished reproducibly and stably with the practical effect that the combustion efficiency can approached 100% while reducing the fuel comsumption rate. Since, moreover, the present invention directly feeds the fuel and air at room temperature to the combustion chamber without preheating them in the intake pipe, contrary to the prior art, it can enjoy practical effects, which cannot be attained according to the prior art, that the charging rate (or the volumetric efficiency) of the air-fuel mixture can be remarkably improved, that the maximum mean effective pressure and the maximum output for the respective R.P.M. of the engine can be increased, and that the inflammability limits at the both rich and lean sides are so shifted as to extend the ignitable range. Moreover, in the present invention, the fuel to be used is not limited to gasoline but can be extended to light oil, benzene, ethyl and methyl alcohols, their mixed oil, emulsion oil with water, air and other chemicals, and the like. In addition to these fuels, any fuel which can be completely vaporized may be also applicable to the present invention.

Thus, the present invention has many advantages in its practical use.

BRIEF DESCRIPTION OF THE DRAWINGS

Various other objects, features and attendant advantages of the present invention will be more fully appreciated as the same becomes better understood from the following detailed description when considered in connection with the accompanying drawings.

FIGS. 12, 13 and 14 are, respectively, a schematic view showing the second embodiment of the present invention, a plane view of the head portion of the piston shown in FIG. 12 and a longitudinal sectional view of the fuel injector as applied to the second embodiment.

DETAILED DESCRIPTION OF THE PREFERRED EMBODIMENTS

Hereafter, the present invention is described in detail by way of preferred embodiments.

Figure 1:
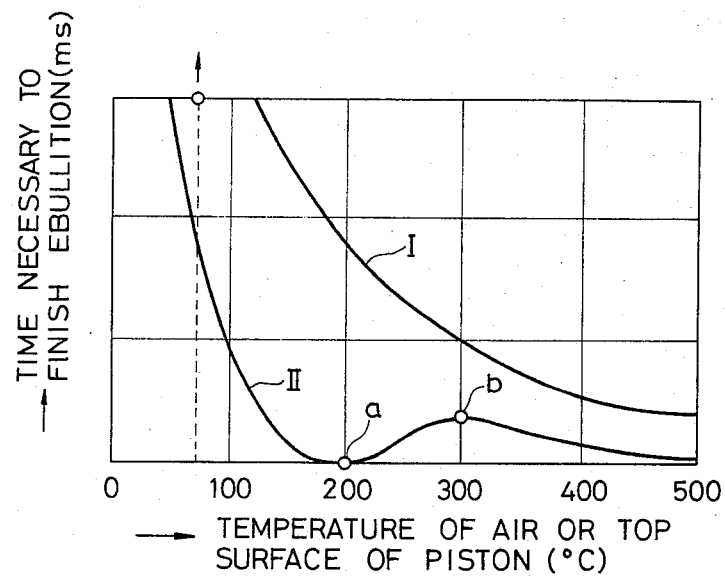
FIGS. 1 and 2 are illustrative views showing tendencies in case the ful droplets are converted into vapors during the suction stroke and compression stroke, respectively.
Figure 2:
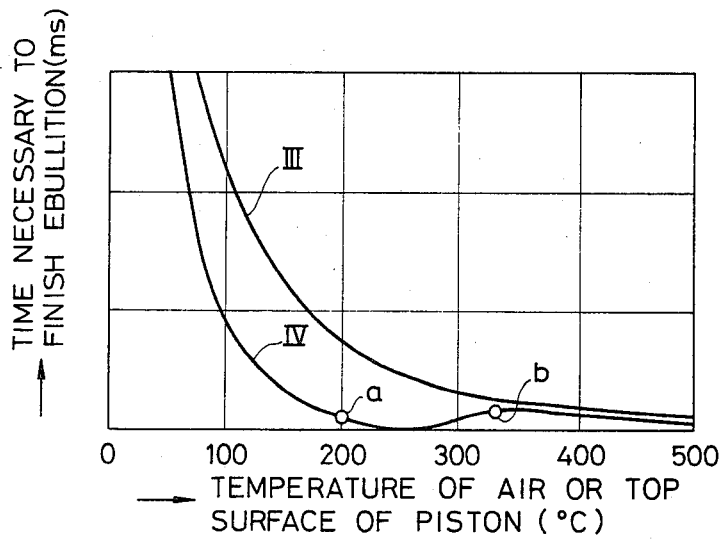
Figure 3:
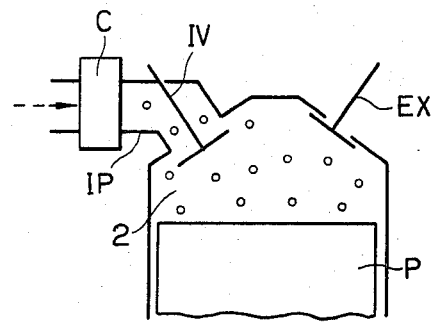
FIGS. 3 and 4 are schematic views showing the internal combustion engine having a usual carburetor according to the prior art, respectively.
Figure 4:
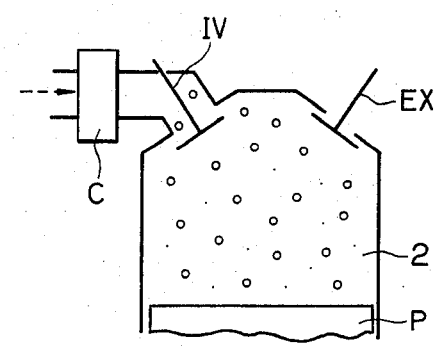
Figure 5:
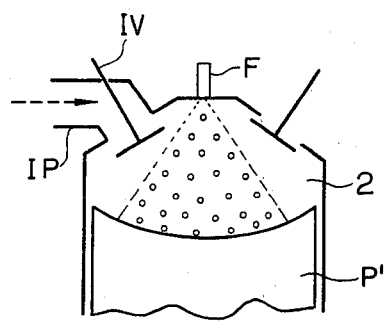
FIGS. 5 and 6 are schematic views showing the direct injection type internal combustion engine with a low pressure fuel injector according to the present invention.
Figure 6:
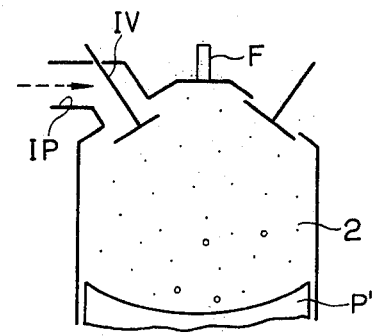
Figure 7:
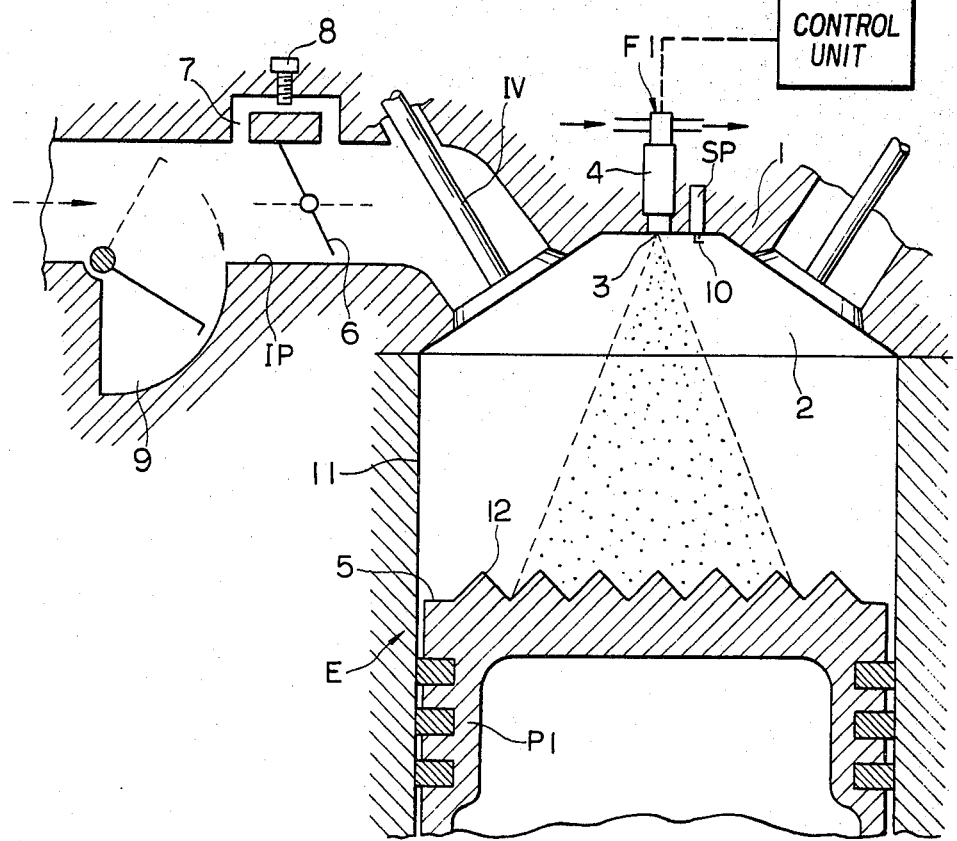
FIGS. 7, 8, 9, 10 and 11 are, respectively, a sectional view showing the first embodiment of the present invention, a plane view of the head portion of the piston shown in FIG. 7, a longitudinal sectional view of the fuel injector as applied to the first embodiment, a partially enlarged longitudinal sectional view of FIG. 9 and a transverse sectional view of the fuel injector as shown in FIG. 10.
Figure 8:
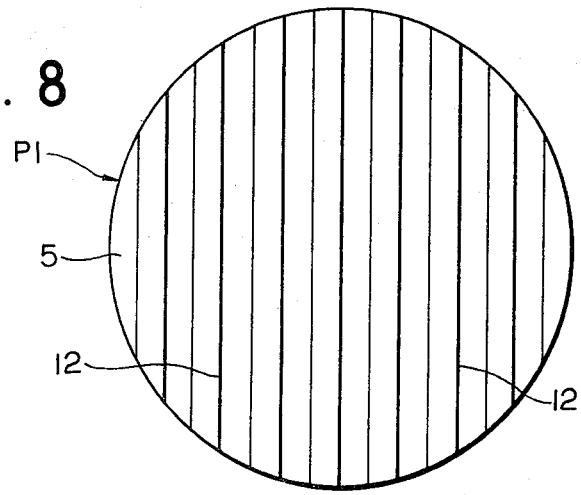

A direct injection type internal combustion engine E according to a first embodiment of the present invention, as shown in FIGS. 7 and 8, is a gasoline engine in which the fuel supplied is injected directly into the combustion chamber, particularly, to the head wall or top surface of the piston formed with fins having a high heat transfer capability. The fuel supply means $F_1$ of the engine E is equipped with a spill type low pressure swirl injection valve 4 of the electronic control type which has its injection port 3 opened through the cylinder head 1 into the combustion chamber 2. The injection valve 4 has its injection port 3 directed to the head wall or top surface 5 of the piston $P_1$ so that the fuel injected therefrom can impinge upon substantially the whole area of the aforementioned head wall 5. The intake passage IP having communication with the combustion chamber 2 through the intake valve IV is equipped at its upstream side with a throttle valve 6 adapted to be opened and closed to control the flow rate of the intake air, an idle adjusting bypass 7, an adjusting screw 8, an air flow meter 9 for detecting the flow rate of the intake air, and an (not-shown) air filter. Moreover, the aforementioned fuel supply means $F_1$ is further equipped with a tachometer for detecting the revolutions per minute of the engine, a control unit for generating such signals as are operative to control the fuel injection rate according to the running conditions of the engine such as the ignition rate, while taking the temperature of the engine cooling water into consideration, in response to the signals relating to the flow rate of the intake air and to the R.P.M. of the engine, and a fuel supply device for supplying the pressurized fuel in a quantity according to the signals of the control unit (both being not shown). There is mounted in the combustion chamber 2 a spark plug SP which has its ignition portion 10 facing the vicinity of the aforementioned injection valve 4. The combustion chamber 2 is defined by the cylinder head 1, the cylinder block 11 and the piston $P_1$. This piston $P_1$ is formed on its head wall 5 with a corrugated portion 12 which has a generally W-shaped longitudinal section.

Figure 9:
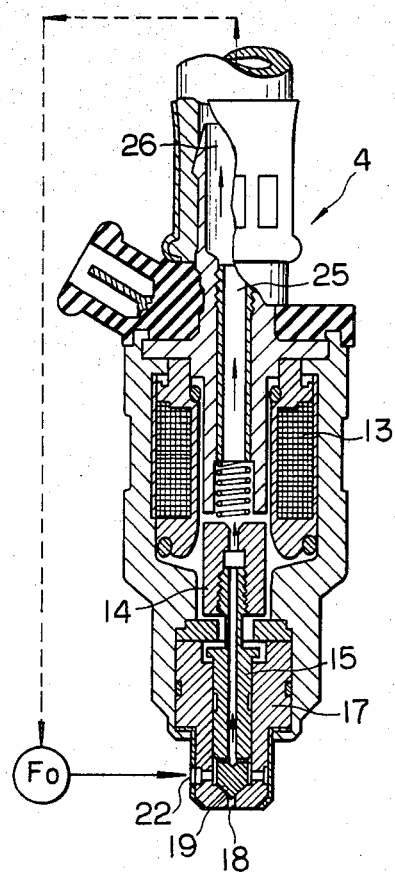
Figure 10:
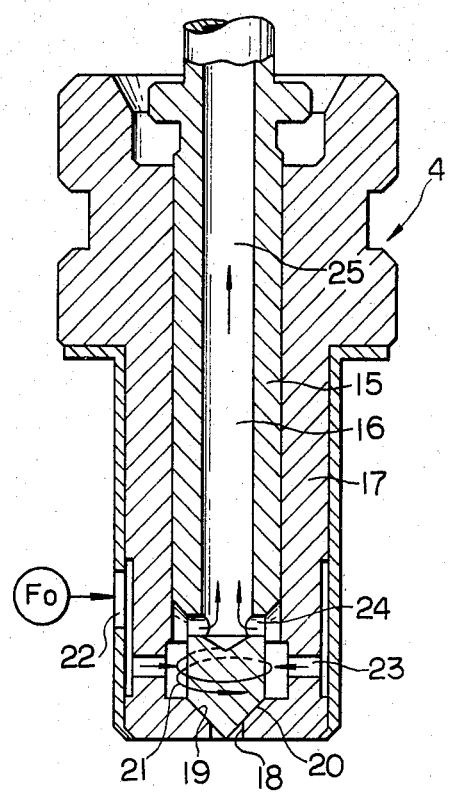
Figure 11:
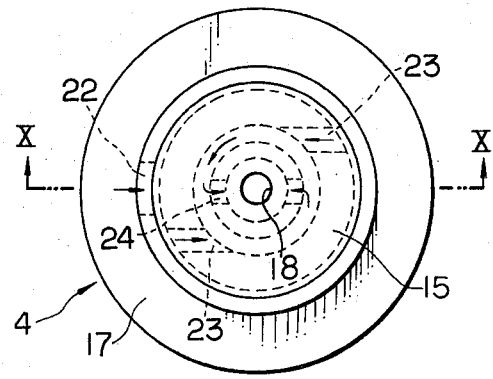

The aforementioned injection valve 5 operates by moving a plunger 14, as shown in FIGS. 9 to 11, in response to the exciting pulse voltage to be impressed upon an electromagnetic coil 13 thereby to move a needle valve 15 up and down so that a pressurized fuel introduction passage 16 is opened and closed to regulate the fuel injection rate in accordance with the power supply duration to the electromagnetic coil 13. The injection valve 4 is formed with a swirl chamber 21 which is defined between the valve seat 19 of an injection port 18 formed at the center of nozzle body 17 and a conical pressure receiving surface 20 formed at the leading end of the needle valve 15 to be seated on the valve seat 19. The needle valve is seated while mating the frustoconical shape and the generally cylindrical shape of the seat, which are coaxial and hollow, with the needle valve. A pressure fuel supply passage 22 is made to communicate with the swirl chamber 21 formed in the side wall portion of the nozzle body 17 while also communicating with a fuel supply source $F_0$ through an (not shown) external fuel pump. Between the aforementioned swirl chamber 21 and pressure fuel supply passage 22, on the other hand, there is formed a pressurized fuel supply tangential passage 23 which extends from the side wall of the nozzle body 17 therethrough along the tangential direction of the inner circumference of the swirl chamber 21. The pressurized fuel supply tangential passage 23 is opened in the same direction as the swirling direction of the pressurized fluid while having communication with the swirl chamber 21 such that the axial direction of its opening is directed along the tangential direction of the inner circumference of the swirl chamber 21 and such that the swirling motions about the axis of the swirl chamber are imparted to the pressurized fuel supplied to the swirl chamber 21. Moreover, the needle valve 15 is formed at its wall portion with an opening 24 which has its axis directed substantially perpendicular with respect to the center of the aforementioned swirl chamber 21 while facing and communicating with the swirl chamber 21. The opening 24 thus formed is made to have further communication with the pressurized fuel spill passage 25 at the discharge side, which runs through and substantially in parallel with the center of the aforementioned swirl chamber 21 and with the aforementioned fuel supply source $F_0$ through a pressure fuel passage 26.

The operational results of the direct injection type internal combustion engine thus constructed according to the first embodiment will be described in the following. The direct injection type internal combustion engine E sucks a preset quantity of intake air into the combustion chamber 2 through the throttle valve 6, the intake passage IP and the intake valve IV during the suction stroke. At this time, the injection valve 4 has its electromagnetic coil 13 supplied with the exciting pulse voltage to generate an electromagnetic attracting force so that the plunger 14 is attracted against the force of the valve spring and is lifted to open the clearance between the needle valve 15 and the valve seat 19 thereby to open the injection port 18. Simultaneously with this, the fuel is introduced through the pressurized fuel supply passage 22 and the pressurized fuel supply tangential passage 23 into the swirl chamber 21 having its diameter and height reduced, where the fuel is so sufficiently swirled that it is injected as fine vapors, which are remarkably excellent in atomizing characteristics and which are remarkably quick in the response of the atomization to the injection pressure, from the injection port 18 to the groove-shaped corrugated portion 12 of the head wall 5 of the piston $P_1$. At this time, the fuel is partially spilled through the spill opening 24 and the pressure fuel spill passage 25 to the fuel supply source $F_0$. Since the diameters of the aforementioned pressurized fuel supply tangential passage 23, spill opening 24, injection port 18 and the like are accurately preset, the flow rate of the fuel to be injected to the outside is basically determined while the needle valve 15 is attracted to the coil 13 and separated from the valve seat 19. In other words, the flow rate of the fuel to be injected to the outside can be adjusted by the time period while the needle valve is attracted. This results in practically markedly beneficial effects where the spill type swirl injection valve 4 is used in a gasoline internal combustion engine. Moreover, the spill type swirl injection valve 4 has its needle valve 15 formed with the spill opening 24, which is directed to face the swirl chamber 21, so that intense or strong flows are always generated in the swirl chamber 21. As a result, if the needle valve 15 is attracted and separated from the valve seat 19 at any time, the liquid flow having a sufficiently high swirling velocity is injected from the injection port 18 to establish a remarkably stable liquid film so that the diameters of the liquid droplets broken up therefrom can be reduced to remarkably small sizes. Thus, the effects obtainable where the fuel is efficiently spilled to continue the intense or strong swirling flows in the swirl chamber 21 by arranging the spill opening 24 to face the swirl chamber 21 are highly significant for improving the atomizing characteristics at the initial stage of the injection. Moreover, the construction that the aforementioned spill opening 24 is formed in the side wall of the needle valve 15 to spill the fuel from the inside of the swirl chamber 21 minimizes the attenuations of the swirling flows in the swirl chamber 21 to continue the more intense or strong swirling flows in the swirl chamber 21 so that the aforementioned effects can be further enhanced. Thus the practical excellent effect that markedly satisfactory atomizing characteristics are realized immediately after the beginning of the injection and before the end of the same by forming the spill opening 24 in a manner to face the aforementioned swirl chamber 21 so that the intense or strong swirling flows of the fuel may be continued in the swirl chamber 21.

Now, in the direct injection type internal combustion engine E according to the first embodiment of the present invention, the temperature at the head wall 5 of the piston $P_1$ is lowered to 200° C. to 300° C. by directly injecting the gasoline to the head wall 5 of the piston $P_1$, which value is in the vicinity of the maximum ebullition point (where the ebullition is effected at the highest rate) so that the atomized droplets of the gasoline are vaporized or boiled at the instant when they make contact with the head wall 5. If the gasoline droplets fail to contact the head wall 5 of the piston $P_1$ and float in air of a lower temperature in the combustion chamber 2 during the suction stroke of the engine, it takes several or several ten times as long to vaporize the atomized droplets. In the present first embodiment, however, since the head wall 5 of the piston $P_1$ is formed with the fin-shaped corrugated portion 12 having a large surface area, the heat transfer between the head wall 5 and the air in the combustion chamber 2 is increased so that the temperature at the head wall 5 can be promptly raised to a suitable level at which the fuel ebullition from the hot solid surface is to be effected.

By suitably selecting the shape and size of the fin-shaped corrugated portion 12, the temperature at the corrugated portion 12 can be adjusted, and at the same time the ebullition rate of the gasoline can be adjusted. On the other hand, most of the gasoline injected during the suction stroke is brought into contact with the head wall 5 of the piston $P_1$ with a sufficient ebullition time so that it almost completely converted into vapors, but a small quantity of atomized droplets floating in the air while being kept away from the head wall 5 is brought into a condition close to the supercritical condition (where the pressure and the temperature are so high that a liquid is wholly converted into gas state), as the temperature and pressure of the air are raised during the compression stroke of the engne, so that they are also completely vaporized. Consequently, almost all of the gasoline is completely converted into vapors before it is ignited with the electric spark of the spark plug SP, because the fuel is injected during the suction stroke to ensure sufficient fuel ebullition time. As a result, combustion is accomplished reproducibly and stably with the practical effect that the combustion efficiency can be raised up to 100% while reducing the fuel consumption rate. Since, moreover, the present first embodiment directly feeds the gasoline and air at room temperature to the combustion chamber 2 without preheating them in the intake pipe, contrary to the prior art, it can enjoy the practical effect, which cannot be attained according to the prior art, that the charging rate (or the volumetric efficiency) of the air-fuel mixture can be remarkably improved, that the maximum mean effective pressure and the maximum output for the respective R.P.M. of the engine can be increased, and that the inflammability limits at both the rich and lean sides are so shifted as to extend the ignitable range. Moreover, the direct injection type internal combustion engine with a low pressure fuel injector according to the present first embodiment can ensure complete combustion so that the discharge ratios of the unburned hydrocarbons HC and carbon monoxide CO can be remarkably reduced. However, since complete combustion with high combustion efficiency is carried out, the combustion temperature is so raised that the discharge ratio of nitrogen oxides (NO) is liable to rise. In order to depress emissions of NO, it is sufficient that the air-fuel ratio is so increased as to effect lean combustion or lean burn by making use of the extension of the inflammability limits at the lean side due to the vaporization of the fuel and to the increase in charging efficiency. By this lean combustion, the NO discharged can be reduced. In addition, the reduction of NO can also be attained by the use of means such as exhaust gas recirculation, a catalyst or the retarding of the ignition timing.

The foregoing description is directed to the case in which gasoline is used as the fuel, but very similar effects can be attained in the case of using light oil. For the case of light oil, however, since the maximum ebullition point for the light oil is about 350° C. in atmospheric air, the temperature at the head wall 5 of the piston $P_1$ has to be raised to a higher level than that for the case of gasoline. The direct injection type internal combustion engine E with a low pressure fuel injector of the present first embodiment can be put into practice by employing as fuel not only gasoline and light oil but also all other fuels that can be completely vaporized, such as benzene, ethyl alcohol, methyl alcohol or their mixed oil, or emulsion oils with other chemicals, water or air. In view of this fact, the direct injection type internal combustion engine E of the present first embodiment can be called a "Multi-Fuel Engine", and can enjoy the practical considerable effect that all of the fuels can be burned in the form of the most proper vapors for combustion merely by interchanging not only the shape and size of the fins of the finned piston, in a broad sense, but also the cooling methods of the piston. Especially, in the case where benzene is used as the fuel of an automotive engine, it has a large octane number so that the compression ratio can be raised. Since, however, the maximum ebullition point of benzene is as low as 120° C. under atmospheric pressure, the temperature at the head wall of the piston has to be held at a rather low level where the benzene is mixed with gasoline. Moreover, since benzene will freeze at a temperature lower than 6° C. and since noxious gases such as benzypyrene may be contained in the engine exhaust gases, benzene can be effectively applied and practiced by mounting a noxious gas removing system thereto thus making the exhaust gases harmless. Likewise, the exhaust gases will become clean if alcohols are used as the automotive fuel. Since, in this instance, methyl and ethyl alcohols have a maximum ebullition point in the vicinity of 120° C. in the atmosphere, it is necessary to hold the temperature of the head wall of the piston low, similarly to the case of benzene, if they are mixed with the gasoline.

In a usual internal combustion engine, generally speaking, it is difficult to always hold the head wall of the piston at the desired maximum ebullition point. In this case, it is necessary to design the head wall of the piston to always be held at a higher level than the maximum ebullition point. This is because, even if the temperature at the head wall of the piston is raised to a higher level than the Leidenfrost point so that the fuel oil is scattered by the head wall of the piston, the fuel oil can be eventually vaporized unless the scattered droplets fly to outside of the head wall of the piston. Even if, moreover, all the fuel is not vaporized during the suction stroke, the temperature and pressure of the air are so raised during the compression stroke that the fuel in the liquid state is brought into the supercritical condition until it continues its gasification while being vaporized.

In any event, as is different from the conventional direct injection case into the combustion chamber, in which the fuel is abruptly injected in the vicinity of the top dead center so that it is not allowed to have sufficient time for ebullition, the direct injection type internal combustion engine E of the present first embodiment allows much time for ebullition during both the suction and compression strokes so that almost all of the liquid fuel can be vaporized without fail.

Since, moreover, the direct injection type internal combustion engine E of the present first embodiment can use the spill type low pressure swirl injection valve 4 of the electronic control type having excellent atomizing performance, a proper quantity of atomized fuel can be injected directly into the combustion chamber 2 at the starting of the engine, thereby to eliminate the trapping of fuel on the inner wall of the intake pipe. As a result, the engine E of the first embodiment can enjoy the effect that the cold starting of the engine can be facilitated. On the other hand, since the inside of the combustion chamber 2 is heated rather quickly after the engine starts so that fuel vapors are generated, the fuel can be completely burned even if the temperature of the cooling water is still at a low level so that much of the emission of the unburned hydrocarbons (HC) will not take place even under a slow running condition immediately after the start. Incidentally, in the case when the ambient temperature is as low as −20° C., the problems accompanying a cold start can be solved by slightly heating the fuel supply means such as the fuel supply pipe in advance with a heater so that the fuel itself is heated to promote its ebullition. On the other hand, although the knocking limit of the direct injection type internal combustion engine E of the present first embodiment is similar to a gasoline engine perfoming normal uniform combustion, the present engine E has a tendency to knock where a higher compression ratio and a higher charging efficiency are used to raise the performance of the gasoline engine. However, the knocking limit of the internal combustion engine E of the present first embodiment can be easily increased by generating swirls and squishes thereby to increase the combustion velocity and by simultaneously performing exhaust gas recirculation. In addition, it is also conceivable to prevent knocking in view of the combustibility of the fuel used. If, for example, the injection timing of the fuel is so adjusted with respect to the approach of the end of the suction stroke that a proper quantity of atomized fuel is left at the time of ignition, the knocking can be prevented because the ignition of the atomized droplets is largely retarded. On the other hand, since alcohols have high antiknock properties, the overall antiknock properties can be improved if the gasoline is mixed with alcohols. Still moreover, an emulsion fuel which is prepared by suspending fine water droplets smaller than several microns in the fuel can also depress knocking and the generation of the NO.

In another aspect, the internal combusiton engine E of the present first embodiment can reduce the fuel consumption rate under a partial load condition. In the internal combustion engine E of the first embodiment, if the throttle valve 6 is fully opened, the charging ratio is increased to extend the ignitable limit so that the air-fuel ratio $(A/F)_{max}$ at the inflammability limit at the lean side can be increased to about 25. As a result, if the fuel injection rate is varied with the throttle valve 6 being fully open while holding the revolutions of the engine and the air intake constant, the air-fuel ratio is varied to change the engine output. More specifically, output control by the air-fuel control, i,e., the so-called "quality control" can be made within a range of $(A/F)=13$ to $(A/F)_{max}$ so that the internal combustion engine E can have a higher thermal efficiency under a partial load condition than that of a usual engine performing "quantity control", while reducing the fuel consumption rate.

However, although quality control cannot be performed within a range having the air-fuel ratio $(A/F)$ exceeding the $(A/F)_{max}$, there arises no practical problem if the engine is run by throttling the throttle valve 6 in such a case. For example, since the charging ratio is low during idling operation, the engine has to be run with the throttle valve 6 being throttled so that the fuel consumption rate is at the same level as that of the usual engine. The change in the control systems in that way can be easily practiced by using the electronic control type injection valve 4 in the present first embodiment. In the internal combustion engine E of the present first embodiment, moreover, if the throttle valve 6 is opened, the air flow meter 9 of the rotatable door type is opened. If the control unit (or electronic computer) is operated in response to the opening of the air flow meter 9, the running condition of the engine and the condition of the ambient air to determine the width of the electric pulses, the electronic control type injection valve 4 is opened for that time period so that a necessary quantity of fuel is injected and supplied to the head wall 5 of the piston $P_1$ in this combustion chamber 2. These operations provide the favorable practical effects that only air passes through the intake manifold so that the air distribution into the respective combustion chambers can be made uniform and that the fuel is injected separately into the respective combustion chambers so that the fuel distribution can also be made uniform. More specifically, since the fuel is introduced into the intake manifold in the case of the conventional carburetor, the injection carburetor or the electronic control type injection valve, the intake pipe wall or the like is wetted with the fuel thereby to make it quite difficult to make the air-fuel ratio common among the respective combustion chambers, which is contrary to the internal combustion engine E of the present first embodiment. In the engine E of the first embodiment, moreover, since the fuel is injected during the suction stroke from the electronic control type injection valve 4 to the corrugated portion of the head wall 5 of the finned piston $P_1$, the atomized fuel is brought into contact with the head wall 5 of the piston $P_1$, which is held at a temperature in the vicinity of the maximum ebullition point for the temperature of the maximum ebullition level, so that it is instantly vaporized. And, the atomized droplets left in an sufficient ebullition condition are sufficiently vaporized by the subsequent compression stroke into complete vapors. As a result, the combustion efficiency is so raised that complete combustion can be accomplished while reducing the fuel consumption rate.

On the other hand, since the internal combustion engine E of the present first embodiment has its intake pipe equipped with no fuel supply means, it is not required to have its intake pipe heated, contrary to the prior art. Since air at normal temperature is sucked directly into the combustion chamber 2 and the atomized fine fuel droplets at normal temperature are injected into the combustion chamber 2, the charging efficiency (or volumetric efficiency) is increased to raise the engine output, and the combustion efficiency is also increased up to 100% so that the emission rate of the HC and NO can be minimized. Since, however, the combustion efficiency of the fuel vapor is high, the combustion temperature is so raised as to invite a tendency of increasing the discharge rate of the NO. This tendency can effectively be practically eliminated by the present embodiment such that the temperature at the head wall 5 of the piston $P_1$ can be reliably adjusted by changing the shape and size of the corrugated portion 12 having the fin shape. If, moreover, the intake valve IV is equipped with an (not-shown) intake swirling box, swirling flows are generated in the combustion chamber 2 to raise the flame propagation velocity so that the running of the engine is stabilized to enhance the antiknocking property. On the other hand, if exhaust gas recirculation is performed, the emission of NO can be further reduced, and the antiknocking property can be further improved. By using the spill type swirl injection valve 4, on the other hand, the internal combustion engine E of the present first embodiment can attain the excellent practical effects that the fuel flow rate can be varied over a wide range and that cold start and the low, medium and high speed running operations can be ensured, because the atomized droplets have small diameters by the use of this injection valve.

In the internal combustion engine E of the present first embodiment, moreover, since the fuel is vaporized, the inflammability limit at the lean side is increased at a high charging efficiency thereby to ensure a large range within which the fuel supply rate may be varied to change the engine output with the throttle valve 6 being fully opened. In other words, the engine E of the first embodiment can attain the effect that there is established a range, within which the fuel consumption rate is not inferior to that of the full load condition even under the partial load condition while reducing the fuel consumption rate under the partial load condition.

Moreover, the internal combustion engine E of the present first embodiment can attain the excellent effect of wide usability in that all fuels such as gasoline, light oil, alcohol, benzene or their mixture oil and emulsion oil with water can be applied and practiced if they can be completely vaporized. Since alcohol and water have especially high antiknocking properties but low emissions of the NO, it is possible to provide a clean and high performance internal combustion engine if their mixture oil is mixed with gasoline or light oil.

The internal combustion engine according to the present invention should not be limited to the first embodiment thus far described but can be extended to the internal combustion engines according to second and third embodiments, as shown in FIGS. 12 to 17. In these Figures, the same portions as those of the aforementioned first embodiment are indicated at the same numbers so that their repeated descriptions may be omitted, and the following descriptions will stress the differences therebetween. More specifically, the internal combustion engine $E_2$ according to the second embodiment of the present invention is different, as shown in FIGS. 12 to 14, from the aforementioned first embodiment in that the piston $P_2$ has its head wall 52 formed with a corrugated portion 120 having an annular, i.e., concentrically circular shape and in that a spill type low pressure swirl injection valve 40 of the electronic control type has its stepped stationary member 42 made reciprocally movable relative to a needle valve 41 and formed with an oblique groove 43 as a pressurized fuel supply tangential passage. However, the engine $E_2$ of the present second embodiment can realize substantially similar operational results to those attained by the aforementioned first embodiment.

Figure 15:
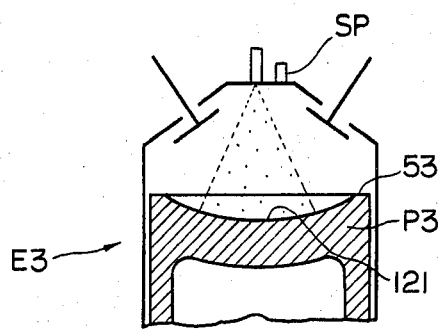
FIGS. 15, 16 and 17, respectively, a schematic view showing the third embodiment of the present invention, a plane view of the head portion of the piston shown in FIG. 15 and a longitudinal sectional view of the fuel injector as applied to the third embodiment.
Figure 16:
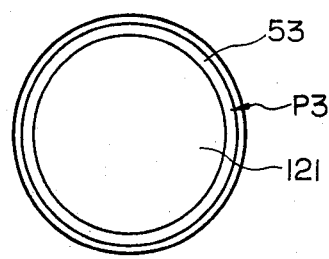
Figure 17:
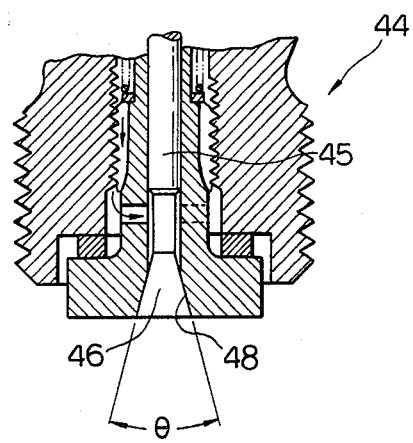

On the other hand, the internal combustion engine $E_3$ according to a third embodiment of the present invention is made different, as shown in FIGS. 15 to 17, in that the piston $P_3$ has its head wall 53 formed with a cup-shaped recess 121 having an arcuately recessed section, in that an electronic control type low pressure swirl injection valve 44 is equipped with a diverging type needle valve 45, in that the needle valve 45 has its leading seat portion 46 formed into a frusto-conical shape such that the seat portion 46 and the seat surface 49 of an injection port 48 are formed to have a preset seat angle of $\theta$, and in that the injection device is of a non-spill type.

In the third embodiment thus constructed, since the head wall 53 of the piston $P_3$ is formed into a circular recess 121, the liquid fuel injected at a wide angle from the injection valve 44 is always returned, even if it is scattered during ebullition, to the bottom of the cup-shaped recess 121 at the head wall 53 of the piston $P_3$ so that its ebullition can be further promoted. The size, shape and the like of the circular recess 121 can be suitably selected in accordance with the scattering condition and range of the liquid fuel, which has once contacted with the head wall 53, during its ebullition. In the present third embodiment, moreover, since the injection valve 44 is of the diverging type, more excellent effects than those of the foregoing embodiments can be attained in addition to those attainable by the foregoing embodiments, including the effect that the valve opening operations by the combustion pressure coming from the combustion chamber 2 are prevented so that no foreign substance may be caught on the injection port 48.

In the foregoing respective embodiments, moreover, various modifications can be made including that the head wall of the piston may be made thick to increase the heat capacity so that temperature fluctuations may be prevented.

Although only representatives of the present invention have been described hereinbefore in connection with the embodiments and modifications, the present invention should not be limited thereto but can be so further modified to allow the embodiments to interchange their components or part.

Obviously, numerous modifications and variations of the present invention are possible in light of the above teachings. It is therefore to be understood that within the scope of the appended claims, the invention may be practiced otherwise than as specifically described herein.

What is claimed is:

1. A direct injection type internal combustion engine having a crankshaft, an intake pipe, an exhaust pipe, and a low pressure fuel injector comprising:
   a cylinder block having at least one cylinder, said cylinder having a central axis;
   a cylinder head mounted on said cylinder block;
   a piston having a large top surface area and a high heat transfer ability and reciprocally movable within said cylinder for effecting rotational motions to said crankshaft;
   a combustion chamber having an upper wall, said combustion chamber being formed by said piston, said cylinder and said cylinder head;
   an intake valve mechanism for opening and closing said intake pipe to be communicated with said combustion chamber;
   igniting means having an igniting portion facing said combustion chamber;
   said low pressure fuel injector having an injection port for injecting a low pressure fuel in a cone shape pattern across a wide injection angle through said at least one cylinder and being disposed at a central portion of said upper wall in said combustion chamber;
   said injection port being directed toward said top surface area of said piston and parallel with said central cylinder axis in order to completely vaporize said low pressure fuel on said top surface area of said piston during a suction stroke of said engine;
   exhaust valve means for opening and closing said exhaust pipe to be communicated with said combustion chamber; and
   means for instantly vaporizing substantially all of said low pressure fuel upon contact with said large top surface area of said piston during said suction stroke.

2. A direct injection type internal combustion engine with a low pressure fuel injector according to claim 1 wherein said means for instantly vaporizing substantially all of said low pressure fuel further comprises means for maintaining said large top surface area of said piston at a predetermined temperature.

3. A direct injection type internal combustion engine with a lower pressure fuel injector according to claim 2 wherein said means for maintaining said large top surface area of said piston at a predetermined temperature further comprises a plurality of fins formed on said large top surface area of said piston for increasing the heat transfer rate of said large surface area of said piston.

4. A direct ignition type internal combustion engine with a low pressure fuel injector according to claim 3 wherein said means for maintaining said large top surface area of said piston at a predetermined temperature further comprises means for maintaining said large top surface area at a temperature below the Leydenfrost point of said low pressure fuel.

5. A direct injection type internal combustion engine with a low pressure fuel injector according to claim 1, further comprising a fuel passage and a fuel supply source fluidly connected to said injection port wherein said low pressure fuel injector further comprises a swirl injection valve having a swirl chamber in which a swirl flow of said low pressure fuel is formed between said injection port and said fuel passage connected to said fuel supply source.

6. A direct injection type internal combustion engine with a low pressure fuel injector according to claim 5, wherein
said swirl injection valve further comprises a spill passage connected to said swirl chamber and to said fuel supply source.

7. A direct injection type internal combustion engine with a low pressure fuel injector according to claim 1, wherein
said top surface area of said piston is formed with a plurality of V-shaped recesses parallel in a predetermined direction and forming a large surface area portion.

8. A direct injection type internal combustion engine with a low pressure fuel injector according to claim 1, wherein
said top surface area of said piston is formed with a circular recess having a predetermined cross section and forming a large surface area portion.

9. A direct injection type internal combustion engine according to claim 6, further comprising engine cooling water disposed in said engine and a control unit operatively associated with said swirl injection valve for generating signals in response to an air flow rate through said intake pipe, an ignition rate of said igniting means and a temperature of said engine cooling water wherein said fuel supply means further comprises a spill type low pressure swirl injection valve comprising a valve body, an electromagnetic coil interposed within said valve body, a plunger interposed within said valve body, a coil spring pressing said plunger, a needle valve connected to said plunger and interposed within said valve body, a swirl chamber formed between a tip portion of said needle valve and said valve body, two tangential passages opened to said swirl chamber and connected to a fuel supply source, a spill passage connected to said swirl chamber and said fuel supply source, and a nozzle opening connected to said swirl chamber and provided at said upper wall of said combustion chamber so as to direct fuel to said top surface area of said piston, said spill type low pressure swirl injection valve beginning to inject a metered quantity of the fuel at a predetermined crank angle in the suction stroke from said nozzle opening over a wide injection angle in response to said signals.

10. A direct injection type internal combustion engine with a low pressure fuel injector according to claim 9, wherein
said top surface area of said piston is formed with a plurality of V-shaped recesses provided in parallel in a predetermined direction and forming a large surface area portion, and wherein said igniting portion of said igniting means is disposed at said upper wall of said combustion chamber.

11. A direct injection type internal combustion engine with a low pressure fuel injector according to claim 6, wherein
said fuel supply means further comprise a spill type low pressure swirl injection valve comprising a valve body, a needle valve interposed within said valve body, a stepped stationary member connected to said needle valve, an oblique groove connected to a chamber between said stepped stationary member and valve body, and a nozzle opening connected to said chamber and provided at a top wall of said combustion chamber so as to direct fuel to a top wall of said piston, said injection valve being controlled electrically.

12. A direct injection type internal combustion engine with a low pressure fuel injector according to claim 11, wherein
said top wall of said piston is formed with a plurality of annular V-shaped recesses provided in parallel to one another at a predetermined distance and forming a large surface area portion, and
said igniting portion of said igniting means is provided at said top wall of said combustion chamber.

13. A direct injection type internal combustion engine with a low pressure fuel injector according to zlaim 5, wherein
said fuel supply means comprise an electronic control type low pressure swirl injection valve comprising a valve body, a needle valve interposed within said valve body, an annular chamber formed between said needle valve and valve body, two tangential passages connected to said annular chamber and a fuel supply source and a diverged nozzle opening connected to said annular chamber.

14. A direct injection type internal combustion engine with a low pressure fuel injector according to claim 13, wherein
said top surface area of said piston is formed with a circular recess having an arcuate like longitudinal section forming a large surface area portion, and
said igniting portion of said igniting means is provided at said upper wall of said combustion chamber.

15. A direct injection type internal combustion engine having a crankshaft, an intake pipe, an exhaust pipe, and a low pressure fuel injector comprising:
a cylinder block having at least one cylinder, said cylinder having a central axis;
a cylinder head mounted on said cylinder block;
a piston having a large top surface area and a high heat transfer ability and reciprocally movable within said cylinder for effecting rotational motions to said crankshaft;
a combustion chamber having an upper wall, said combustion chamber being formed by said piston, said cylinder and said cylinder head;
an intake valve mechanism for opening and closing said intake pipe to be communicated with said combustion chamber;
igniting means having an igniting portion facing said combustion chamber;
said low pressure fuel injector having an injection port for injecting a low pressure fuel in a cone shape pattern across a wide injection angle through said at least one cylinder and being disposed at a central portion of said upper wall in said combustion chamber;
said injection port being directed toward said top surface area of said piston and parallel with said central cylinder axis in order to completely vaporize said low pressure fuel on said top surface area of said piston during a suction stroke of said engine; and
exhaust valve means for opening and closing said exhaust pipe to be communicated with said combustion chamber;
means for injecting said low pressure fuel into said combustion chamber during said intake stroke; and
means for instantly vaporizing substantially all of said low pressure fuel upon contact with said large top surface area of said piston during said suction stroke.

* * * * *